United States Patent
Smith

(10) Patent No.: US 9,854,744 B2
(45) Date of Patent: Jan. 2, 2018

(54) ADJUSTING BALE DENSITY SETTING BASED ON BALE WEIGHT AND/OR MOISTURE

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 317 days.

(21) Appl. No.: 14/567,612

(22) Filed: Dec. 11, 2014

(65) Prior Publication Data
US 2016/0165803 A1   Jun. 16, 2016

(51) Int. Cl.
| G01M 1/38 | (2006.01) |
| A01F 15/08 | (2006.01) |
| G05B 15/02 | (2006.01) |
| A01F 15/07 | (2006.01) |

(52) U.S. Cl.
CPC .......... *A01F 15/0833* (2013.01); *G05B 15/02* (2013.01); *A01F 2015/077* (2013.01)

(58) Field of Classification Search
CPC .... A01F 15/0833; A01F 15/077; G05B 15/02
USPC ........................................................ 700/275
See application file for complete search history.

(56) References Cited

U.S. PATENT DOCUMENTS

| 4,691,503 A | 9/1987 | Frerich |
| 5,551,218 A | 9/1996 | Henderson et al. |
| 5,622,104 A | 4/1997 | Viesselmann et al. |
| 5,979,141 A | 11/1999 | Phillips |
| 5,996,307 A | 12/1999 | Niemerg et al. |
| 6,247,291 B1 | 6/2001 | Underhill |
| 6,272,825 B1 | 8/2001 | Anderson et al. |
| 6,726,559 B2 | 4/2004 | Bischoff |
| 7,322,167 B2 | 1/2008 | Chapon et al. |
| 7,430,959 B2 | 10/2008 | Routledge |
| 7,472,649 B1 | 1/2009 | Derscheid |
| 7,703,391 B2 | 4/2010 | Duenwald et al. |
| 7,849,791 B2 | 12/2010 | Smith |
| 2008/0148703 A1* | 6/2008 | Smith ................. A01F 15/0833 56/341 |
| 2011/0068809 A1* | 3/2011 | Falbo ................... G01N 27/048 324/664 |
| 2012/0179338 A1 | 7/2012 | Dresher |
| 2013/0042770 A1* | 2/2013 | Verhaeghe .......... A01F 15/0825 100/35 |
| 2014/0165856 A1* | 6/2014 | Varley ................. A01F 15/0705 100/40 |
| 2014/0261023 A1* | 9/2014 | Smith ................. A01F 15/0833 100/40 |

FOREIGN PATENT DOCUMENTS

EP        0479190        4/1992

* cited by examiner

*Primary Examiner* — Robert Cassity
(74) *Attorney, Agent, or Firm* — Patrick M. Sheldrake

(57) ABSTRACT

A bale density adjustment system for adjusting the density pressure on bale during formation comprising: a bale chamber, at least a first density adjuster, at least a first weight sensor, at least a first diameter sensor, at least a first operator interface, and a controller, in operable communication with and configured to process digital and/or analog information from the at least first weight sensor, the at least first diameter sensor, the at least first density adjuster, and the at least first operator interface.

20 Claims, 4 Drawing Sheets

ADJUSTING BALE DENSITY SETTING BASED ON BALE WEIGHT AND/OR MOISTURE

TECHNOLOGY FIELD

The present disclosure relates generally to a system to adjust the density pressure applied to a bale of crop material, and specifically to a system that senses and utilizes bale weight and optionally bale moisture to adjust the density pressure during the active formation of a bale.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

Typically, the forming of a bale is terminated according to a diameter criterion. Depending on the crop and its moisture level, the weight of bales and the dry matter content can vary widely, even within the same field. It would be advantageous to sense and adjust multiple criterion, including bale moisture, to provide a more uniform bales during the baling process.

A variety of sensors are incorporated into a large, cylindrical bale baler in U.S. Pat. No. 5,622,104. In particular, the use of a bale size sensor is disclosed. Additional sensors are suggested for bale RPM, crop moisture, horsepower demands, belt tension, and bale weight. Wild et al. reported a hay yield monitoring system for round balers with strain gages on the tongue and axle of the vehicles, which provided a measure of the weight of the baler and the bale. They also added accelerometers to measure vertical accelerations during operation and determined stationary loads within 2% of actual weight.

A cylindrical bale baler system was disclosed in U.S. Pat. No. 6,378,276. The system comprises an electronic evaluation unit for processing signals from displacement sensors and a pendulum, transmitting the bale weight to an output unit with which the data are displayed or stored, such as on a yield card. Additionally, a control device may control various baler functions. Further, a moisture sensor for crop material may be connected with the evaluation unit for an automatic conversion to weight of the dry mass of the big round bale.

In U.S. Application No. 2013/0160661 A1, a system is described that incorporates various sensors, including ones for diameter, weight, and moisture, an electronic control unit, and a density adjustment system. The system collects historical data regarding bale weights, and adjusts the amount of belt tension applied to future bales to achieve both a target bale weight and bale size. One disadvantage of this system is that the adjustment of the belt tension takes place in between baling cycles and is based purely on previously baled crop. Such a system cannot adjust for crop variations, for example a sudden increase in crop moisture level, until additional historical data is collected.

There is, therefore, a need for a baling system that can measure the diameter, weight, and moisture content of a bale while the bale is being formed, and make real-time adjustments to the density pressure placed upon the bale to correct for any encountered variations in crop conditions. Such a system would provide a more consistent bale weight and size from bale to bale, even when encountering high variations of crop moisture or crop weight.

SUMMARY

The disclosure relates to a bale density adjustment system comprising: a baling mechanism comprising a bale chamber and at least a first density adjuster configured to adjust of the density of a bale in the bale chamber; at least a first weight sensor, located in or proximate to the bale chamber, configured to measure a bale weight of a bale in the bale chamber; at least a first diameter sensor, located in or proximate to the bale chamber, configured to measure a bale diameter of a bale in the bale chamber; at least a first operator interface configured to receive and/or store a predetermined bale weight value and a predetermined bale diameter value from an operator; and a controller, in operable communication with and configured to process digital and/or analog information from the at least first weight sensor, the at least first diameter sensor, the at least first density adjuster, and the at least first operator interface.

In some embodiments, the at least first density adjuster is in fluid communication with at least a first hydraulic circuit, positioned within or proximate to the bale chamber, configured to adjust the position and/or tension of at least a first baling belt during the formation of a bale. In some embodiments, the at least first density adjuster is in fluid communication with at least a first hydraulic circuit, positioned within or proximate to the bale chamber, configured to adjust the width and/or volume of at least a first crop collection channel during the formation of a bale. In some embodiments, the at least first density adjuster is in fluid communication with at least a first hydraulic circuit, positioned within or proximate to the bale chamber, configured to adjust the position of at least a first movable roller during the formation of a bale. In some embodiments, the at least first density adjuster is in fluid communication with at least a first hydraulic circuit, positioned within or proximate to the bale chamber, configured to adjust the position of at least a first movable roller during the formation of a bale; whereupon, in a first operational mode, hydraulic fluid is in fluid communication with at least a first hydraulic tension actuator, located in or proximate to a bale chamber and mechanically linked to the at least first movable roller, such that the at least first density adjuster sends a signal to a potentiometer on the at least first hydraulic circuit that allows hydraulic fluid sent to the rod-side of the at least first hydraulic actuator to move the at least first movable roller.

In some embodiments, the at least first operator interface is configured to receive and/or display a measurement from the at least first weight sensor and/or the at least first diameter sensor.

In some embodiments, the controller is in continuous operable communication with the at least first weight sensor, the at least first diameter sensor, the at least first density adjuster, and/or the at least first operator interface. In some embodiments, the controller is configured to command the density adjuster to adjust the density of a bale in the bale chamber if one or a combination of the bale weight and/or bale diameter are different or substantially different than the predetermined bale weight value and/or the predetermined bale diameter value.

In some embodiments, the bale density adjustment system further comprises at least a first moisture sensor, positioned within or proximate to the bale chamber, configured to measure moisture levels in a bale in the bale chamber; wherein the at least first operator interface is configured to receive and/or store a predetermined bale moisture value from an operator; and wherein the controller is in continuous operable communication with and configured to process information from the at least first moisture sensor. In some embodiments, the at least first operator interface is configured to receive and/or display a measurement from the at least first moisture sensor. In some embodiments, the controller is configured to command the density adjuster to adjust the density of a bale in the bale chamber if one or a combination of the bale weight, bale diameter, and/or moisture levels are different or substantially different than the predetermined bale weight value, the predetermined bale diameter value, and/or the predetermined bale moisture value.

The present disclosure also relates to a computer-implemented method of adjusting the density of a bale, in a system comprising a baling mechanism, at least one density adjuster, and a controller, said method comprising: (a) in the controller, receiving a bale diameter value and/or a bale weight value from at least a first operator interface, prior to the complete formation of the bale; (b) in the controller, collecting one or a combination of: (i) a real-time measurement corresponding to bale diameter from at least one diameter sensor, or (ii) a real-time measurement corresponding to bale weight from at least one diameter weight, prior to the complete formation of the bale; and (c) in the controller, comparing the measurement corresponding to bale diameter to the bale diameter value and/or the measurement corresponding to weight to the bale weight value; and, if the measurement corresponding to the bale diameter and/or bale weight is different from the bale diameter value and/or bale weight value, commanding the at least one density adjuster to adjust the density during the formation of a bale in the baling mechanism.

In some embodiments, step (b) of the computer-implemented method comprises collecting both of (i) and (ii); and wherein step (c) of the computer-implemented method comprises comparing the measurement corresponding to bale diameter to the bale diameter value; and, if the measurement corresponding to the bale weight is different from the bale weight value, commanding at least one density adjuster to adjust the density during the formation of a bale in the baling mechanism.

In some embodiments, the system further comprises at least a first operator interface in electronic communication with the controller, the density adjuster, and the baling mechanism, such that the controller is configured to receive and send digital information to and from the density adjuster and the at least first operator interface; and wherein the method comprises: (a) in a controller, receiving an upper bale weight value, a lower bale weight value, a bale diameter value, a diameter trigger value, and a density step value from the at least first operator interface; (b) in a controller, collecting a real-time measurement corresponding to bale diameter from at least one diameter sensor, and comparing the measurement corresponding to bale diameter to the diameter trigger value; (c) in a controller, collecting a real-time measurement corresponding to bale weight from at least one weight sensor, and comparing the measurement corresponding to bale weight to the lower bale weight value and/or the upper bale weight value; (d) in a controller, collecting a real-time measurement corresponding to bale diameter from at least one diameter sensor; and comparing the measurement corresponding to bale diameter to the bale diameter value; wherein step (b): (1) if the measurement corresponding to the bale diameter is less than the diameter trigger value, the controller repeats step (b); and (2) if the measurement corresponding to the bale diameter is greater than the diameter trigger value, the controller proceeds to step (c); wherein step (c): (1) if the measurement corresponding to the bale weight is less than the lower bale weight value, commanding at least one density adjuster to adjust the density by a positive density step value during the formation of a bale; (2) if the measurement corresponding to the bale weight is greater than the upper bale weight value, commanding at least one density adjuster to adjust the density by a negative density step value during the formation of a bale; and wherein step (d): (1) if the measure corresponding to the bale diameter value does not equal the bale diameter value, the controller repeats step (b); (2) if the measure corresponding to the bale diameter value equals the bale diameter value, the controller initiates the wrapping and ejection of the bale.

In some embodiments, step (a) of the computer-implemented method further comprises receiving a bale moisture value from at least a first operator interface; wherein step (b) comprises collecting both (i), (ii) and (iii) a real-time measurement corresponding to bale moisture from at least one moisture sensors; and wherein step (c) comprises comparing the measurement corresponding to bale moisture to the bale moisture value; and, if the measurement corresponding to the bale moisture is different from the bale moisture value, commanding at least one density adjuster to adjust the density during the formation of a bale.

In some embodiments, the system further comprises at least a first operator interface in electronic communication with the controller, the density adjuster, and the baling mechanism, such that the controller is configured to receive and send digital information to and from the density adjuster and the at least first operator interface; and wherein the method comprises: (a) in a controller, receiving an upper bale weight value, a lower bale weight value, a bale diameter value, a bale moisture value, a diameter trigger value, a density step value, and a high-moisture density value from at least a first operator interface; (b) in a controller, collecting a real-time measurement corresponding to bale moisture from at least one moisture sensor, and comparing the measurement corresponding to bale moisture to the bale moisture value; (c) in a controller, collecting a real-time measurement corresponding to bale diameter from at least one diameter sensor, and comparing the measurement corresponding to bale diameter to the diameter trigger value; (d) in a controller, collecting a real-time measurement corresponding to bale weight from at least one weight sensor, and comparing the measurement corresponding to bale weight to the lower bale weight value and/or the upper bale weight value; (e) in a controller, collecting a real-time measurement corresponding to bale diameter from at least one diameter sensor; and comparing the measurement corresponding to bale diameter to the bale diameter value; wherein step (b): (1) if the measurement corresponding to the bale moisture is less than the bale moisture value, the controller proceeds to step (c); (2) if the measurement corresponding to the bale moisture value is greater than the bale moisture value, commanding at least one density adjuster to adjust the density to the high-moisture density value during the formation of bale, and the controller proceeds to step (e); wherein step (c): (1) if the measurement corresponding to the bale diameter is less than the diameter trigger value, the controller repeats step (b); (2) if the measurement corresponding to the bale diameter is greater than the diameter trigger value, the controller proceeds to step (d); wherein step (d): (1) if the measurement corresponding to the bale weight is less than the lower bale weight value, commanding at least one density adjuster to adjust the density by a positive density step value during the formation of a bale; (2) if the measurement corresponding to the bale weight is greater than the upper bale weight value, commanding at least one density adjuster to adjust the density by a negative density step value during the formation of a bale; and wherein step (e): (1) if the measure corresponding to the bale diameter value does not equal the bale diameter value, the controller repeats step (b); (2) if the measure corresponding to the bale diameter value equals the bale diameter value, the controller initiates the wrapping and ejection of the bale.

The present disclosure also relates to a computer-implemented method of adjusting the density of a bale, in a system comprising a baling mechanism, at least one density adjuster, and a controller, said method comprising: (a) in a controller, calculating a density value corresponding to the density of the bale in the baling mechanism using the measurement corresponding to bale weight and measurement corresponding to bale diameter; (b) in a controller, comparing the density value to a predetermined density target value; and, if the density value is different to the predetermined density target value, commanding at least one density adjuster to adjust the density during the formation of a bale; and (c) in a controller, initiating the wrapping and ejection of a bale.

The present disclosure also relates to a computer program product comprising instructions to execute the following steps: (a) in the controller, receiving a bale diameter value and/or a bale weight value from at least a first operator interface, prior to the complete formation of the bale; (b) collecting one or a combination of: (i) a real-time measurement corresponding to bale diameter from at least one diameter sensor, or (ii) a real-time measurement corresponding to bale weight from at least one diameter weight, prior to the complete formation of the bale; and (c) in the controller, comparing the measurement corresponding to bale diameter to the bale diameter value and/or the measurement corresponding to weight to the bale weight value; and, if the measurement corresponding to the bale diameter and/or bale weight is different from the bale diameter value and/or bale weight value, commanding the at least one density adjuster to adjust the density during the formation of a bale in the baling mechanism.

In some embodiments, step (a) of the computer program product further comprises receiving a bale moisture value from at least a first operator interface; wherein step (b) comprises collecting both (i), (ii) and (iii) a real-time measurement corresponding to bale moisture from at least one moisture sensors; and wherein step (c) comprises comparing the measurement corresponding to bale moisture to the bale moisture value; and, if the measurement corresponding to the bale moisture is different from the bale moisture value, commanding at least one density adjuster to adjust the density during the formation of a bale.

In some embodiments, the system further comprises at least a first operator interface in electronic communication with the controller, the density adjuster, and the baling mechanism, such that the controller is configured to receive and send digital information to and from the density adjuster and the at least first operator interface; and wherein the method comprises: (a) in a controller, receiving an upper bale weight value, a lower bale weight value, a bale diameter value, a bale moisture value, a diameter trigger value, a density step value, and a high-moisture density value from at least a first operator interface; (b) in a controller, collecting a real-time measurement corresponding to bale moisture from at least one moisture sensor, and comparing the measurement corresponding to bale moisture to the bale moisture value; (c) in a controller, collecting a real-time measurement corresponding to bale diameter from at least one diameter sensor, and comparing the measurement corresponding to bale diameter to the diameter trigger value; (d) in a controller, collecting a real-time measurement corresponding to bale weight from at least one weight sensor, and comparing the measurement corresponding to bale weight to the lower bale weight value and/or the upper bale weight value; (e) in a controller, collecting a real-time measurement corresponding to bale diameter from at least one diameter sensor; and comparing the measurement corresponding to bale diameter to the bale diameter value; wherein step (b): (1) if the measurement corresponding to the bale moisture is less than the bale moisture value, the controller proceeds to step (c); (2) if the measurement corresponding to the bale moisture value is greater than the bale moisture value, commanding at least one density adjuster to adjust the density to the high-moisture density value during the formation of bale, and the controller proceeds to step (e); wherein step (c): (1) if the measurement corresponding to the bale diameter is less than the diameter trigger value, the controller repeats step (b); (2) if the measurement corresponding to the bale diameter is greater than the diameter trigger value, the controller proceeds to step (d); wherein step (d): (1) if the measurement corresponding to the bale weight is less than the lower bale weight value, commanding at least one density adjuster to adjust the density by a positive density step value during the formation of a bale; (2) if the measurement corresponding to the bale weight is greater than the upper bale weight value, commanding at least one density adjuster to adjust the density by a negative density step value during the formation of a bale; and wherein step (e): (1) if the measure corresponding to the bale diameter value does not equal the bale diameter value, the controller repeats step (b); (2) if the measure corresponding to the bale diameter value equals the bale diameter value, the controller initiates the wrapping and ejection of the bale.

The present disclosure also relates to a harvester comprising a bale density adjustment system comprising: a baling mechanism comprising a bale chamber and at least a first density adjuster configured to adjust of the density of a bale in the bale chamber; at least a first weight sensor, located in or proximate to the bale chamber, configured to measure a bale weight of a bale in the bale chamber; at least a first diameter sensor, located in or proximate to the bale chamber, configured to measure a bale diameter of a bale in the bale chamber; at least a first operator interface configured to receive and/or store a predetermined bale weight value and a predetermined bale diameter value from an operator; and a controller, in operable communication with and configured to process digital and/or analog information from the at least first weight sensor, the at least first diameter sensor, the at least first density adjuster, and the at least first operator interface.

In some embodiments, the present disclosure provides data for each bale made in a large cylindrical baling operation for decision making, display, archival, and automatic control. Parameters sensed by the present invention include bale diameter, bale weight, moisture content, and geographical location. Moisture measurements can be taken after a bale has reached a predetermined diameter. Readings will be available as volume averaged moisture content of the bale as the bale diameter increased from the predetermined value to the terminal value. Finished bales will be weighed before ejection from the baler. A history of recent bale weights can be stored and used to adjust future bale densities to achieve desired terminal weights and sizes. To effect varying densities, a variable fluid pressure relief valve is provided to the belt tensioner, thus the resistance of the tensioner arm to rotation away from the bale is variable.

In some embodiments, various forms of identification with which to associate a particular bale with its data are available. A simple alphanumeric ID may be stamped in ink or paint on the bale or wrapping. A printout of an ID and/or bale data on a slip of paper or cardstock may be dropped between the crop material and the binding material. A Radio Frequency chip or chips may be incorporated in bale wrapping, twine, or simply dropped between the crop material and the wrapper. Other electronic chips may also be used, including transponders. Bale data may be stored on the electronic media, or only an ID, which may be cross referenced in archived data.

In some embodiments, an object of this invention is to provide volume averaged moisture content readings of a bale beginning after a predetermined bale diameter has been achieved. Another object of this invention is to utilize bale size and weight histories to adjust a bale density to achieve both a terminal size and weight. Still another object is to provide an identification system for large round bales after they have been formed.

DETAILED DESCRIPTION

Figure 1:
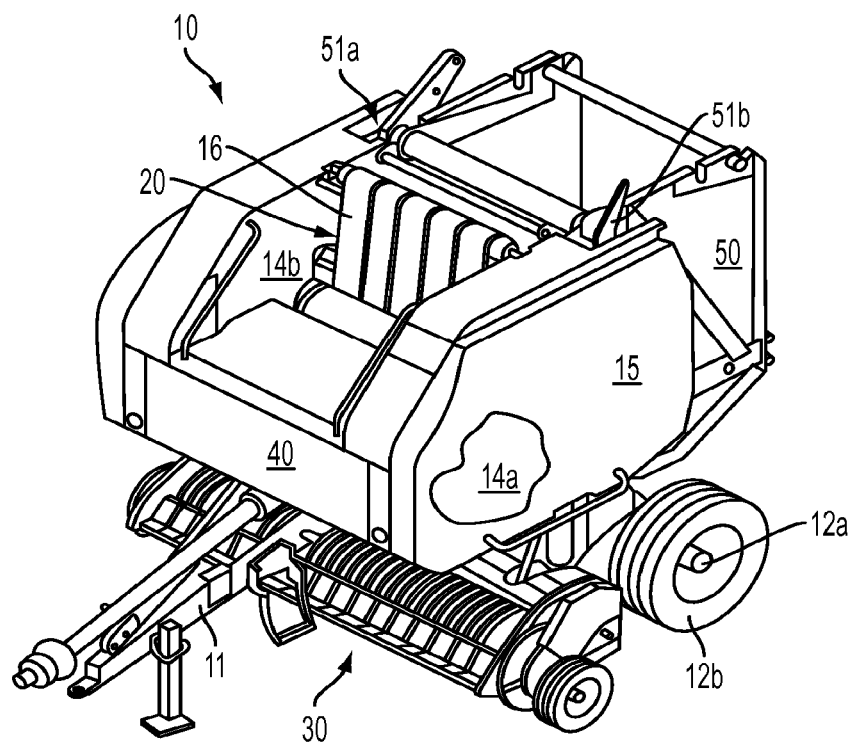
FIG. 1 depicts a static image of a baler.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine designed to consolidate and/or package material so as to facilitate the storage and handling of the material for later use. In some embodiments, the harvester is used to harvest agricultural material. In some embodiments, the harvester is an agricultural baler, a waste baler, or a combine comprising a baling mechanism.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683 A1 that illustrates such mechanisms, the disclosures of which are incorporated herein by reference in their entirety.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "real-time" and the phrase "in real-time" as used herein are defined as a way of describing a process, event, or action that occurs simultaneously with the process of actively forming a bale in a bale chamber. In some embodiments, various sensors, for example a diameter sensor, continuously sense information about a bale and transmit that information to a controller in real-time. In some embodiments, the bale density adjustment system of the present disclosure can adjust the density pressure on a bale in real-time. In some embodiments, an operator may adjust inputted values in an operator interface in real-time.

Many of the fastenings, connections, processes and other means and components utilized in this invention are widely known and used in the field of the invention described, and their exact nature or type is not necessary for an understanding and use of the invention by a person skilled in the art, and they will not therefore be discussed in significant detail.

Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine. In some embodiments, the combine comprises a baling mechanism.

The present disclosure relates to a bale density adjustment system that can adjust the density pressure on a bale during formation, so that completed bales are similar in respect to weight and diameter, even with varying moisture levels in the crop material. This system uses various sensors to collect information on several parameters, such as bale weight, bale diameter, and bale moisture, and compares this information to values predetermined by operator input during the formation of a bale. If necessary, the system can increase or decrease density pressure on a bale by communicating with a variable density adjuster, which can regulate various hydraulic circuits in the baler or harvester. Since the system works in 'real-time' as the bale is being formed, rapid adjustments to the density pressure can be made to counteract rapid changes in the moisture content of the harvested crop material. In some embodiments, the system can work without a moisture sensor. Simply measuring bale weight and diameter during bale formation provides enough information to adjust the density pressure in order to keep a consistent weight and diameter from bale to bale. In some embodiments, the system operator has the ability to input values, including but not limited to a target bale diameter, a bale weight range (a lower bale weight value and a higher bale weight value), a bale moisture threshold, and the amount of density pressure change.

In some embodiments, the method of calculating bale weight and bale diameter involves the following algorithm:

Parameters:
DIA—Current Bale Diameter
D—Desired Bale Diameter
W—Desired Bale Weight
WEIGHT—Current weight
PRESSURE—Density Pressure
MOISTURE—Current Bale Moisture
M—Threshold moisture
P—Density Pressure at high moisture

WHEN DIA>D-6

The number 6 is number of inches away from full bale to start evaluating bale weight, however, the operator may set independently variable values for diameter used to initiate when bale weight measurements may begin to be taken prior to or during use of a disclosed method.

IF WEIGHT<$W*DIA^2/D^2$−25,THEN PRESSURE=PRESSURE*1.1

IF WEIGHT>$W*DIA^2/D^2$+25,THEN PRESSURE=PRESSURE*0.9

For this example ±25 lbs is the acceptable accuracy of the weight, however independently variable values for weight accuracy may be set prior to or during use of a disclosed method.

$DIA^2/D^2$ is the ratio of current volume of the bale/end volume of the bale

This compares the current bale density to the desired bale density as:

Density=$W/(PI*D^2/4*L)$, and $L$ is constant(bale Length) for all diameters.

In some embodiments, the operator preprograms a value corresponding to desired bale diameter and to desired bale weight into the system prior to or simultaneously with calculating the current bale moisture levels, the current bale weight measurements, or the density pressure values. In some embodiments, prior to adjusting the bale pressure, the comparison of current bale density versus desired bale density is calculated by finding $DIA^2/D^2$ In some embodiments, the algorithm applied to the step of measuring bale density comprises:

IF MOISTURE>$M$,THEN PRESSURE=$P$

In some embodiments, the variable for accuracy of the weight of the bale is set to about plus and/or minus 25 pounds, about plus and/or minus 20 pounds, about plus and/or minus 15 pounds, about plus and/or minus 10 pounds, about plus and/or minus 5 pounds or less. In some embodiments, the variable value for diameter measurement used to initiate when bale weight measurements may begin to be taken prior to or during use of a disclosed method are from about 1 to about 10 (referring to the number of inches below a desired diameter). In some embodiments, the variable value for diameter measurement used to initiate when bale weight measurements may begin to be taken prior to or during use of a disclosed method are from about 4 to about 6 (referring to the number of inches below a desired diameter).

In some embodiments, the hydraulic circuits in the baler are configured to adjust the position and/or tension of at least a first baling belt during the formation of a bale. In some embodiments, the hydraulic circuits in the baler are configured to adjust the width and/or volume of at least a first crop collection channel during the formation of a bale. In some embodiments, the hydraulic circuits in the baler are configured to adjust the position of at least a first movable roller during the formation of a bale. In some embodiments, the hydraulic circuits in the baler are in fluid communication with at least one hydraulic tension actuator, located in or proximate to a bale chamber and mechanically linked to the at least first movable roller, such that the at least first density adjuster sends a signal to a potentiometer on the at least first hydraulic circuit that allows hydraulic fluid sent to the rod-side of the at least first hydraulic actuator to move the at least first movable roller.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed through a harvesting assembly (not shown) into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2:
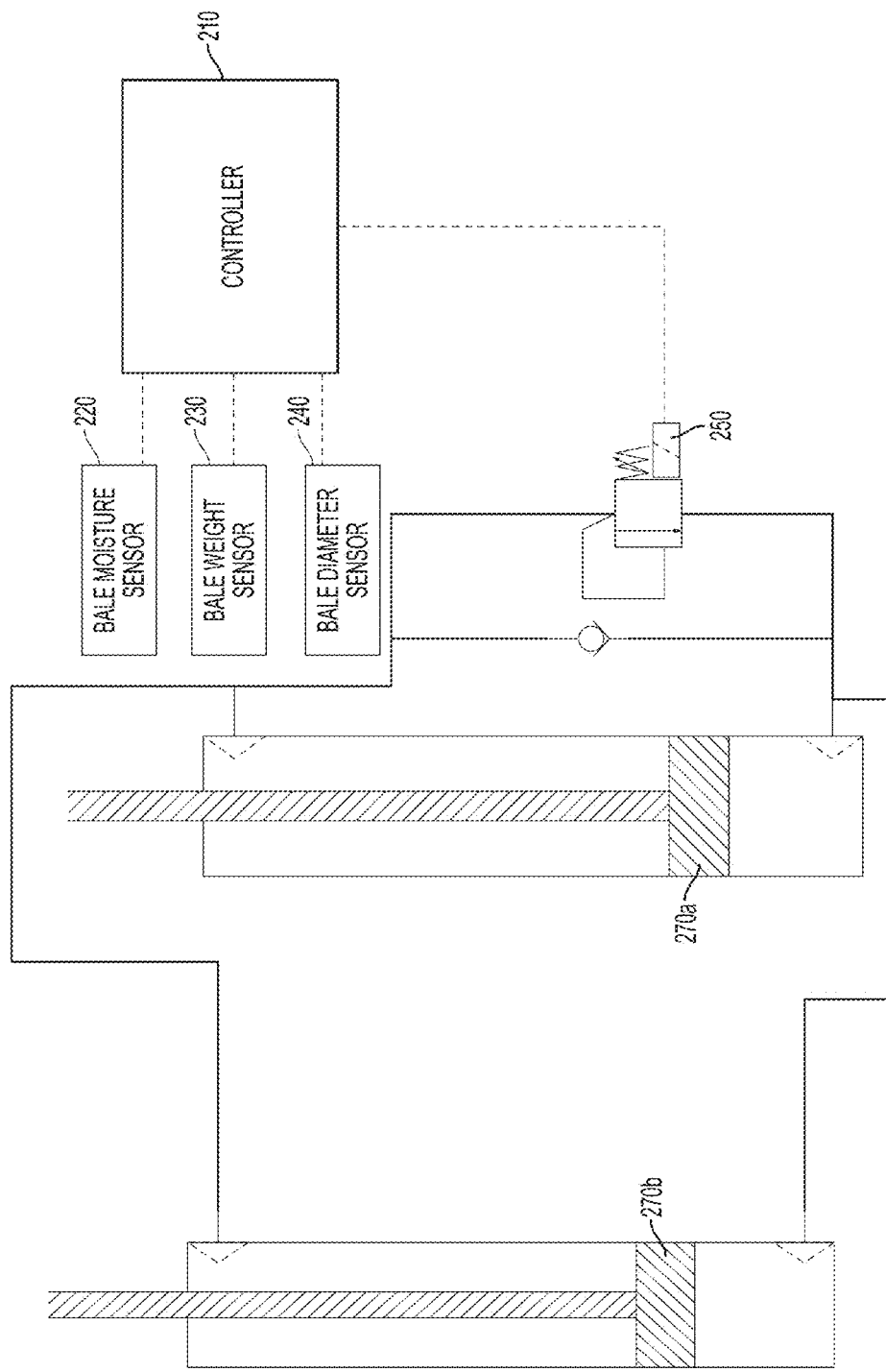
FIG. 2 depicts a diagram of a bale density adjustment system with sensors, a controller, and a hydraulic system

FIG. 2 depicts an diagram overview of some of the physical components of the bale density adjustment system. A controller 210 is electronically connected to and in operable communication with a bale moisture sensor 220, a bale weight sensor 230, and a bale diameter sensor 240. Collectively, the sensors would be located in or proximate to a bale chamber of a harvester. In some embodiments, there are more than one of each sensor present in the system, for example, the system could contain two or more bale moisture sensors. In some embodiments, the controller 210 is also electronically connected to and in operable communication with an operator interface, configured to receive and/or store predetermined values, for example a bale diameter value, from an operator.

The controller 210 is also electronically connected to and in operable communication with a density adjuster 250. The density adjuster 250 is configured to adjust the density of a bale by adjusting a hydraulic circuit. In the depicted embodiment, the hydraulic circuit is connected to a pair of tension actuators 270a and 270b. Upon command of the controller 210, the density adjuster 250 can increase or decrease the pressure exerted by the tension actuators 270a and 270b. In some embodiments, the tension actuators are located in or proximate to a bale chamber and mechanically linked to one or more movable rollers which can adjust the position of one or more baling belts in the bale chamber. In some embodiments, one or more potentiometers are also connected to the hydraulic circuit, allowing hydraulic fluid sent to the rod-side of the tension actuators 270a and 270b to move the one or more movable rollers.

Figure 3:
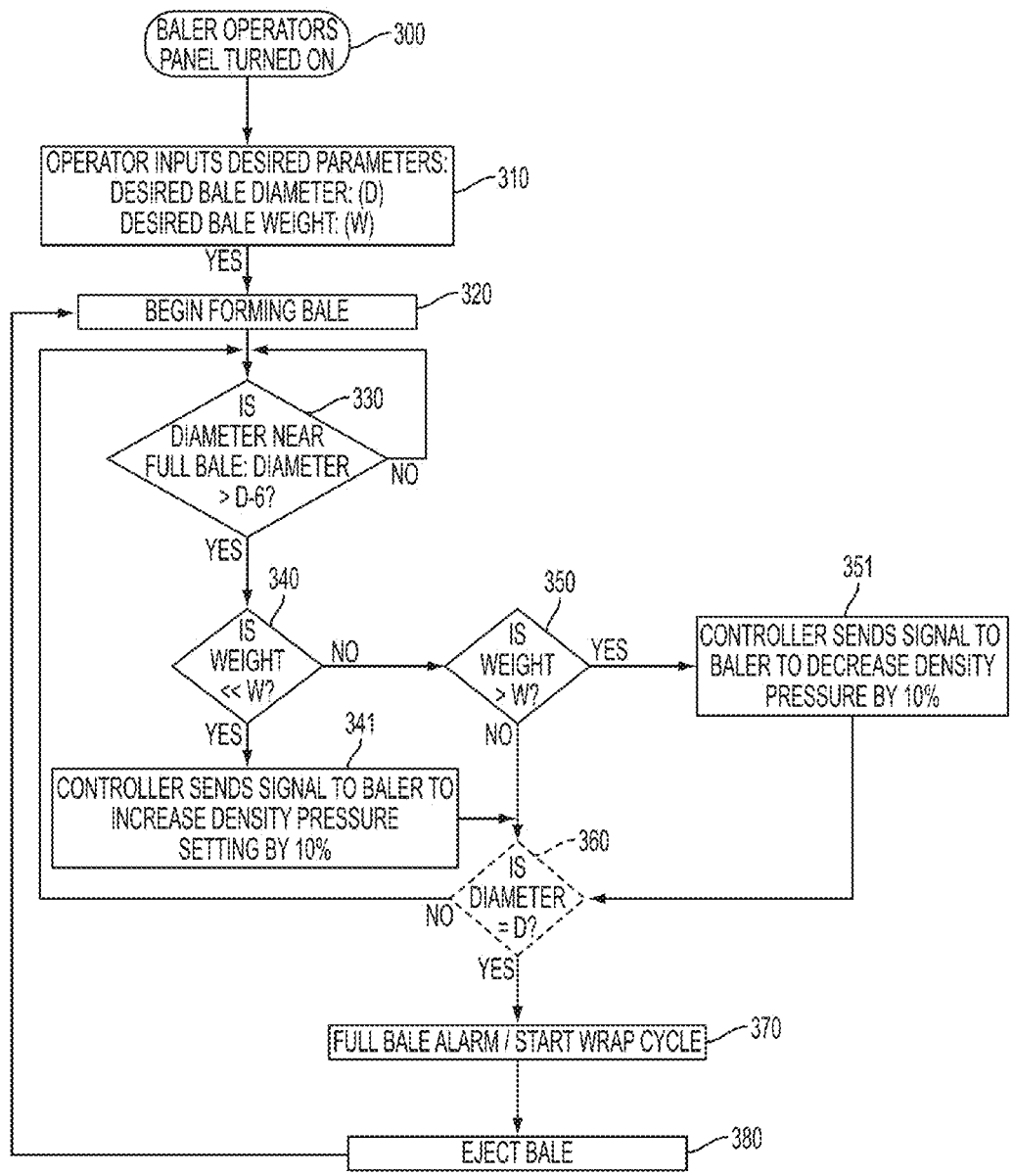
FIG. 3 depicts a flow diagram of a bale density adjustment process with weight and diameter sensors.

FIG. 3 depicts a flow diagram of a bale density adjustment process with weight and diameter sensors. In step 300, the process begins when the operator interface is turned on. The operator inputs a series of desired parameters in step 310, including, but not limited to, a bale diameter value and a bale weight value. Once all of the desired parameter have been inputted, the operator interface communicates the parameters to the controller, and bale formation can commence in step 320.

As the bale is formed in the bale chamber, the diameter sensor sends information on the current diameter of the bale to the controller. In step 330, the controller compares this bale diameter measurement with the bale diameter value from the operator interface, minus a depth value. In some embodiments the depth value represents a depth in inches. In some embodiments, the depth value is a whole integer. In some embodiments, the depth value is predetermined or fixed by the controller. In some embodiments, the depth value is variable, and may be inputted or altered by the operator at the operator interface. In some embodiments, the depth value is 20, 19, 18, 17, 16, 15, 14, 13, 12, 11, 10, 9, 8, 7, 6, 5, 4, 3, 2, or 1. In the depicted embodiment, the depth value is 6. When the bale diameter measurement is less than the bale diameter value minus the depth value, the controller continues to collect bale diameter measurements from the diameter sensor. When the bale diameter measurement is greater than the bale diameter value minus the depth value, the controller proceeds to step 340. In some embodiments, the bale diameter value minus the depth value can be replaced with a diameter trigger value, which is a value that is less than the diameter value. In some embodiments, the diameter trigger value is predetermined or fixed by the controller. In some embodiments, the diameter trigger value is variable, and may be imputed or altered by the operator at the operator interface.

Once the bale diameter measurement is close to the bale diameter value, the weight sensor sends information on the current weight of the bale to the controller. In step 340 the controller compares the bale weight measurement with the bale weight value from the operator interface to determine if the bale weight measurement is much less than the bale weight value. In some embodiments, the phrase 'much less than' means if the bale weight measurement is less than 95% of the bale weight value. In some embodiments, the phrase 'much less than' means if the bale weight measurement is less than 90% of the bale weight value. In some embodiments, the phrase 'much less than' means if the bale weight measurement is less than 85% of the bale weight value. In some embodiments, the phrase 'much less than' means if the bale weight measurement is less than 80% of the bale weight value. In some embodiments, the phrase 'much less than' means if the bale weight measurement is less than 75% of the bale weight value. In some embodiments, the phrase 'much less than' means if the bale weight measurement is less than 70% of the bale weight value. In some embodiments, the phrase 'much less than' means if the bale weight measurement is less than 65% of the bale weight value. In some embodiments, the phrase 'much less than' means if the bale weight measurement is less than 60% of the bale weight value. In some embodiments, the controller compares the bale weight measurement with a lower bale weight value that is inputted by the operator from the operator interface. When the bale weight measurement is much less than the bale weight value, or when the bale weight measurement is less than the lower bale weight value, the controller proceeds to step 341 where the controller commands the density adjuster to increase the density pressure. In the depicted embodiment, the density pressure is increased by 10%. In some embodiments, the density pressure is increased by 5%. In some embodiments, the density pressure is increased by 6%. In some embodiments, the density pressure is increased by 7%. In some embodiments, the density pressure is increased by 8%. In some embodiments, the density pressure is increased by 9%. In some embodiments, the density pressure is increased by 15%. In some embodiments, the density pressure is increased by 20%. Once step 341 is complete, the controller proceeds to step 360. When the bale weight measurement is not much less than the bale weight value, or when the bale weight measurement is greater than the lower bale weight value, the controller proceeds to step 350.

If the controller proceeds to step 350, the controller compares the bale weight measurement with the bale weight value from the operator interface to determine if the bale weight measurement is greater than the bale weight value. In some embodiments, the controller compares the bale weight measurement with a higher bale weight value that is inputted by the operator from the operator interface. When the bale weight measurement is greater than the bale weight value or the higher bale weight value, the controller proceeds to step 351 where the controller commands the density adjuster to decrease the density pressure. In the depicted embodiment, the density pressure is decreased by 10%. In some embodiments, the density pressure is decreased by 5%. In some embodiments, the density pressure is decreased by 6%. In some embodiments, the density pressure is decreased by 7%. In some embodiments, the density pressure is decreased by 8%. In some embodiments, the density pressure is decreased by 9%. In some embodiments, the density pressure is decreased by 15%. In some embodiments, the density pressure is decreased by 20%. Once step 351 is complete, the controller proceeds to step 360. When the bale weight measurement is not greater than the bale weight value or higher bale weight value, the controller proceeds to step 360.

In step 360, the controller collects new information on the current diameter from the diameter sensor, and then compares this bale diameter measurement to the bale diameter value from the operator interface. In the bale diameter measurement is less than the bale diameter value, the controller returns to step 330. If the bale diameter measurement is equal to the bale diameter value, the baling process stops and the controller proceeds to step 370, where the 'full bale' alarm signals the operator and the bale wrapping cycle is initiated. Once the bale wrapping cycle is complete, the controller moves to step 380 where the fully wrapped bale is ejected from the bale chamber. The controller than returns to step 320 where the process begins with a new bale if desired.

Figure 4:
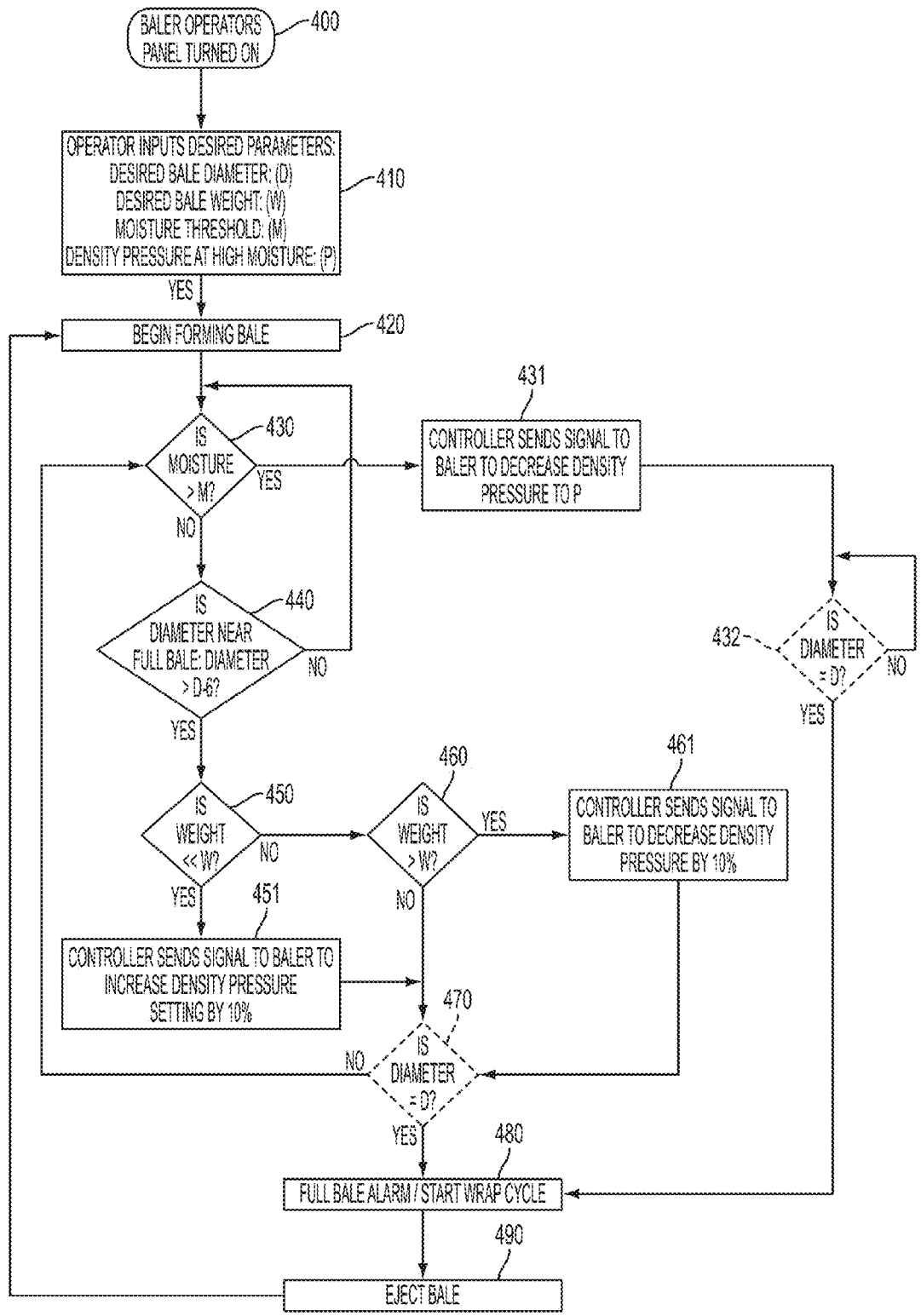
FIG. 4 depicts a flow diagram of a bale density adjustment process with weight, diameter, and moisture sensors.

FIG. 4 depicts a flow diagram of a bale density adjustment process with weight, diameter, and moisture sensors. In step 400, the process begins when the operator interface is turned on. The operator inputs a series of desired parameters in step 410, including, but not limited to, a bale diameter value, a bale weight value, a bale moisture value, and a high moisture density value. Once all of the desired parameter have been inputted, the operator interface communicates the parameters to the controller, and bale formation can commence in step 420.

Once bale formation has begun, the moisture sensor sends information on the current moisture level of the bale to the controller. In step 430, the controller compares this bale moisture measurement with the bale moisture value from the operator interface to determine if the bale moisture measurement is greater than the bale moisture value. When the bale moisture measurement is greater than the bale moisture value, the controller proceeds to step 431 where the controller commands the density adjuster to set the density pressure to the high moisture density value inputted by the operator. Once the adjustment to the high moisture density value is complete, the diameter sensor sends information on the current diameter level of the bale to the controller. In step 432, the controller compares this bale diameter measurement to the bale diameter value from the operator interface. In the bale diameter measurement is less than the bale diameter value, the controller repeats step 432. If the bale diameter measurement is equal to the bale diameter value, the baling process stops and the controller proceeds to step 480. Completing the description of step 430, when the bale moisture measurement is not greater than the bale moisture value, the controller proceeds to step 440.

In step 440, the diameter sensor sends information on the current diameter of the bale to the controller. The contoller compares this bale diameter measurement with the bale diameter value from the operator interface, minus a depth value. In some embodiments the depth value represents a depth in inches. In some embodiments, the depth value is a whole integer. In some embodiments, the depth value is predetermined or fixed by the controller. In some embodiments, the depth value is variable, and may be inputted or altered by the operator at the operator interface. In some embodiments, the depth value is 20, 19, 18, 17, 16, 15, 14, 13, 12, 11, 10, 9, 8, 7, 6, 5, 4, 3, 2, or 1. In the depicted embodiment, the depth value is 6. When the bale diameter measurement is less than the bale diameter value minus the depth value, the controller returns to step 430. When the bale diameter measurement is greater than the bale diameter value minus the depth value, the controller proceeds to step 450. In some embodiments, the bale diameter value minus the depth value can be replaced with a diameter trigger value, which is a value that is less than the diameter value. In some embodiments, the diameter trigger value is predetermined or fixed by the controller. In some embodiments, the diameter trigger value is variable, and may be imputed or altered by the operator at the operator interface.

Once the bale diameter measurement is close to the bale diameter value, the weight sensor sends information on the current weight of the bale to the controller. In step 450 the controller compares the bale weight measurement with the bale weight value from the operator interface to determine if the bale weight measurement is much less than the bale weight value. In some embodiments, the phrase 'much less than' means if the bale weight measurement is less than 95% of the bale weight value. In some embodiments, the phrase 'much less than' means if the bale weight measurement is less than 90% of the bale weight value. In some embodiments, the phrase 'much less than' means if the bale weight measurement is less than 85% of the bale weight value. In some embodiments, the phrase 'much less than' means if the bale weight measurement is less than 80% of the bale weight value. In some embodiments, the phrase 'much less than' means if the bale weight measurement is less than 75% of the bale weight value. In some embodiments, the phrase 'much less than' means if the bale weight measurement is less than 70% of the bale weight value. In some embodiments, the phrase 'much less than' means if the bale weight measurement is less than 65% of the bale weight value. In some embodiments, the phrase 'much less than' means if the bale weight measurement is less than 60% of the bale weight value. In some embodiments, the controller compares the bale weight measurement with a lower bale weight value that is inputted by the operator from the operator interface. When the bale weight measurement is much less than the bale weight value, or when the bale weight measurement is less than the lower bale weight value, the controller proceeds to step 451 where the controller commands the density adjuster to increase the density pressure. In the depicted embodiment, the density pressure is increased by 10%. In some embodiments, the density pressure is increased by 5%. In some embodiments, the density pressure is increased by 6%. In some embodiments, the density pressure is increased by 7%. In some embodiments, the density pressure is increased by 8%. In some embodiments, the density pressure is increased by 9%. In some embodiments, the density pressure is increased by 15%. In some embodiments, the density pressure is increased by 20%. Once step 451 is complete, the controller proceeds to step 470. When the bale weight measurement is not much less than the bale weight value, or when the bale weight measurement is greater than the lower bale weight value, the controller proceeds to step 460.

If the controller proceeds to step 460, the controller compares the bale weight measurement with the bale weight value from the operator interface to determine if the bale weight measurement is greater than the bale weight value. In some embodiments, the controller compares the bale weight measurement with a higher bale weight value that is inputted by the operator from the operator interface. When the bale weight measurement is greater than the bale weight value or the higher bale weight value, the controller proceeds to step 461 where the controller commands the density adjuster to decrease the density pressure. In the depicted embodiment, the density pressure is decreased by 10%. In some embodiments, the density pressure is decreased by 5%. In some embodiments, the density pressure is decreased by 6%. In some embodiments, the density pressure is decreased by 7%. In some embodiments, the density pressure is decreased by 8%. In some embodiments, the density pressure is decreased by 9%. In some embodiments, the density pressure is decreased by 15%. In some embodiments, the density pressure is decreased by 20%. Once step 461 is complete, the controller proceeds to step 470. When the bale weight measurement is not greater than the bale weight value or higher bale weight value, the controller proceeds to step 470.

In step 470, the controller collects new information on the current diameter from the diameter sensor, and then compares this bale diameter measurement to the bale diameter value from the operator interface. In the bale diameter measurement is less than the bale diameter value, the controller returns to step 430. If the bale diameter measurement is equal to the bale diameter value, the baling process stops and the controller proceeds to step 480, where the 'full bale' alarm signals the operator and the bale wrapping cycle is initiated. Once the bale wrapping cycle is complete, the controller moves to step 490 where the fully wrapped bale is ejected from the bale chamber. The controller than returns to step 420 where the process begins with a new bale if desired.

In some embodiments, the sensors described in this disclosure are continuously collecting information and communicating said information to the controller, even if the controller is not actively using that information in a process or a calculation. In some embodiments, the controller has instantaneous or near-instantaneous access to information collected by various sensors or inputted by an operator.

In some embodiments, an operator can input or alter any previous input of various values, ranges, and other information pertinent to the present disclosure at any time prior to, during, or after bale formation. In some embodiments, an operator can alter previous input even while the density adjustment system of the present disclosure is actively adjusting the density pressure placed on a bale.

In some embodiments, FIGS. 3 and 4 are flow diagram overviews of the logic processes used by a computer program product stored in and deriving processing power from the controller and/or the operator interface. In some embodiments, the bale pressure adjustment system of the present disclosure contains both computer program product elements ("software"), and computer microprocessing and logic hardware.

Having described a series of embodiments, it will become apparent that various modifications can be made without departing from the scope of the invention as defined in the accompanying claims. Various publications, including patents, published applications, technical articles and scholarly articles are cited throughout the specification. Each of these cited publications is incorporated by reference herein, in its entirety.

What is claimed is:

1. A bale density adjustment system comprising:
   a baling mechanism comprising:
      a bale chamber; and
      at least a first density adjuster configured to adjust of the density of a bale in the bale chamber;
   at least a first weight sensor, located in or proximate to the bale chamber, configured to measure a bale weight of a bale in the bale chamber;
   at least a first diameter sensor, located in or proximate to the bale chamber, configured to measure a bale diameter of a bale in the bale chamber;
   at least a first operator interface configured to receive and/or store a diameter trigger value, a predetermined bale weight value and a predetermined bale diameter value from an operator; and
   a controller, in operable communication with and configured to process digital and/or analog information from the at least first weight sensor, the at least first diameter sensor, the at least first density adjuster, and the at least first operator interface;
   wherein the controller is configured to collect a measurement corresponding to the bale diameter from the at least one first diameter sensor, and compare the measurement corresponding to the bale diameter to the diameter trigger value, and
      (i) if the measurement corresponding to the bale diameter is less than the diameter trigger value, the controller is configured to repeat collection of the measurement corresponding to the bale diameter; and
      (ii) if the measurement corresponding to the bale diameter is greater than the diameter trigger value, the controller is configured to collect a measurement corresponding to the bale weight from the at least one first weight sensor, and compare the measurement corresponding to the bale weight to the predetermined bale weight value.

2. The bale density adjustment system of claim 1, wherein the at least first density adjuster is in fluid communication with at least a first hydraulic circuit, positioned within or proximate to the bale chamber, configured to adjust the position and/or tension of at least a first baling belt during the formation of a bale.

3. The bale density adjustment system of claim 1, wherein the at least first density adjuster is in fluid communication with at least a first hydraulic circuit, positioned within or proximate to the bale chamber, configured to adjust the width and/or volume of at least a first crop collection channel during the formation of a bale.

4. The bale density adjustment system of claim 1, wherein the at least first density adjuster is in fluid communication with at least a first hydraulic circuit, positioned within or proximate to the bale chamber, configured to adjust the position of at least a first movable roller during the formation of a bale.

5. The bale density adjustment system of claim 1, wherein the at least first density adjuster is in fluid communication with at least a first hydraulic circuit, positioned within or proximate to the bale chamber, configured to adjust the position of at least a first movable roller during the formation of a bale; whereupon, in a first operational mode, hydraulic fluid is in fluid communication with at least a first hydraulic tension actuator, located in or proximate to a bale chamber and mechanically linked to the at least first movable roller, such that the at least first density adjuster sends a signal to a potentiometer on the at least first hydraulic circuit that allows hydraulic fluid sent to the rod-side of the at least first hydraulic actuator to move the at least first movable roller.

6. The bale density adjustment system of claim 1, wherein the at least first operator interface is configured to receive and/or display a measurement from the at least first weight sensor and/or the at least first diameter sensor.

7. The bale density adjustment system of claim 1, wherein the controller is in continuous operable communication with the at least first weight sensor, the at least first diameter sensor, the at least first density adjuster, and/or the at least first operator interface.

8. The bale density adjustment system of claim 1, wherein the controller is configured to command the density adjuster to adjust the density of a bale in the bale chamber if one or a combination of the bale weight and/or bale diameter are different or substantially different than the predetermined bale weight value and/or the predetermined bale diameter value.

9. The bale density adjustment system of claim 1 further comprising at least a first moisture sensor, positioned within or proximate to the bale chamber, configured to measure moisture levels in a bale in the bale chamber;
  wherein the at least first operator interface is configured to receive and/or store a predetermined bale moisture value from an operator; and
  wherein the controller is in continuous operable communication with and configured to process information from the at least first moisture sensor.

10. The bale density adjustment system of claim 9, wherein the at least first operator interface is configured to receive and/or display a measurement from the at least first moisture sensor.

11. The bale density adjustment system of claim 9, wherein the controller is configured to command the density adjuster to adjust the density of a bale in the bale chamber if one or a combination of the bale weight, bale diameter, and/or moisture levels are different or substantially different than the predetermined bale weight value, the predetermined bale diameter value, and/or the predetermined bale moisture value.

12. A computer-implemented method of adjusting the density of a bale, in a system comprising a baling mechanism, at least one density adjuster, and a controller, said method comprising:
  (a) in the controller, receiving a diameter trigger value, a bale diameter value and/or a bale weight value from at least a first operator interface, prior to the complete formation of the bale; and
  (b) in the controller, collecting a real-time measurement corresponding to a bale diameter from at least one diameter sensor, and comparing the measurement corresponding to the bale diameter to the diameter trigger value, prior to complete formation of the bale;
  wherein if the measurement corresponding to the bale diameter is less than the diameter trigger value, the method comprises, in the controller, repeating collection of the measurement corresponding to the bale diameter;
  wherein if the measurement corresponding to the bale diameter is greater than the diameter trigger value, the method comprises, in the controller, collecting a real-time measurement corresponding to a bale weight from at least one weight sensor, and comparing the measurement corresponding to the bale weight to the bale weight value; and
  wherein if the measurement corresponding to the bale weight is different from the bale weight value, commanding the at least one density adjuster to adjust the density during the formation of a bale in the baling mechanism.

13. The method of claim 12, wherein the system further comprises at least a first operator interface in electronic communication with the controller, the density adjuster, and the baling mechanism, such that the controller is configured to receive and send digital information to and from the density adjuster and the at least first operator interface; and wherein the method comprises:
  (a) in a controller, receiving an upper bale weight value, a lower bale weight value, a bale diameter value, and a density step value from the at least first operator interface;
  (b) in a controller, collecting the real-time measurement corresponding to the bale weight from at least one weight sensor, and comparing the measurement corresponding to the bale weight to the lower bale weight value and/or the upper bale weight value;
  (c) in a controller, collecting a real-time measurement corresponding to bale diameter from at least one diameter sensor; and comparing the measurement corresponding to bale diameter to the bale diameter value;
  wherein step (b):
    (1) if the measurement corresponding to the bale weight is less than the lower bale weight value, commanding at least one density adjuster to adjust the density by a positive density step value during the formation of a bale;
    (2) if the measurement corresponding to the bale weight is greater than the upper bale weight value, commanding at least one density adjuster to adjust the density by a negative density step value during the formation of a bale; and
  wherein step (c):
    (1) if the measure corresponding to the bale diameter value does not equal the bale diameter value, the controller repeats step (b) of claim 12;
    (2) if the measure corresponding to the bale diameter value equals the bale diameter value, the controller initiates the wrapping and ejection of the bale.

14. The method of claim 12, wherein step (a) further comprises receiving a bale moisture value from at least a first operator interface; wherein the method comprises collecting a real-time measurement corresponding to bale moisture from at least one moisture sensors; and wherein the method comprises comparing the measurement corresponding to bale moisture to the bale moisture value; and, if the measurement corresponding to the bale moisture is different from the bale moisture value, commanding at least one density adjuster to adjust the density during the formation of a bale.

15. The method of claim 12, wherein the system further comprises at least a first operator interface in electronic communication with the controller, the density adjuster, and the baling mechanism, such that the controller is configured to receive and send digital information to and from the density adjuster and the at least first operator interface; and wherein the method comprises:
  (a) in a controller, receiving an upper bale weight value, a lower bale weight value, a bale diameter value, a bale moisture value, a density step value, and a high-moisture density value from at least a first operator interface;
  (b) in a controller, collecting a real-time measurement corresponding to bale moisture from at least one moisture sensor, and comparing the measurement corresponding to bale moisture to the bale moisture value;
  (c) in a controller, collecting the real-time measurement corresponding to the bale weight from at least one weight sensor, and comparing the measurement corresponding to the bale weight to the lower bale weight value and/or the upper bale weight value;
  (d) in a controller, collecting a real-time measurement corresponding to bale diameter from at least one diameter sensor; and comparing the measurement corresponding to bale diameter to the bale diameter value;
wherein step (b):
(1) if the measurement corresponding to the bale moisture is less than the bale moisture value, the controller proceeds to step (b) of claim 12;
(2) if the measurement corresponding to the bale moisture value is greater than the bale moisture value, commanding at least one density adjuster to adjust the density to the high-moisture density value during the formation of bale, and the controller proceeds to step (d);
wherein step (c):
(1) if the measurement corresponding to the bale weight is less than the lower bale weight value, commanding at least one density adjuster to adjust the density by a positive density step value during the formation of a bale;
(2) if the measurement corresponding to the bale weight is greater than the upper bale weight value, commanding at least one density adjuster to adjust the density by a negative density step value during the formation of a bale; and
wherein step (d):
(1) if the measure corresponding to the bale diameter value does not equal the bale diameter value, the controller repeats step (b) of claim 12;
(2) if the measure corresponding to the bale diameter value equals the bale diameter value, the controller initiates the wrapping and ejection of the bale.

16. A computer-implemented method of adjusting the density of a bale, in a system comprising a baling mechanism, at least one density adjuster, and a controller, said method comprising:
(a) in a controller, receiving a diameter trigger value, prior to the complete formation of the bale;
(b) in a controller, collecting a measurement corresponding to a bale diameter from at least one diameter sensor, and comparing the measurement corresponding to the bale diameter to the diameter trigger value, prior to complete formation of the bale, wherein (1) if the measurement corresponding to the bale diameter is less than the diameter trigger value, the method comprises, in the controller, repeating collection of the measurement corresponding to the bale diameter, and (2) if the measurement corresponding to the bale diameter is greater than the diameter trigger value, the method comprises, in the controller, collecting a measurement corresponding to a bale weight from at least one weight sensor;
(c) in a controller, calculating a density value corresponding to the density of the bale in the baling mechanism using the measurement corresponding to the bale weight and the measurement corresponding to the bale diameter;
(d) in a controller, comparing the density value to a predetermined density target value; and, if the density value is different to the predetermined density target value, commanding at least one density adjuster to adjust the density during the formation of a bale; and
(e) in a controller, initiating the wrapping and ejection of a bale.

17. A computer program product comprising instructions to execute the following steps:

(a) in the controller, receiving a diameter trigger value, a bale diameter value and/or a bale weight value from at least a first operator interface, prior to the complete formation of the bale; and
(b) in the controller, collecting a real-time measurement corresponding to a bale diameter from at least one diameter sensor, and comparing the measurement corresponding to the bale diameter to the diameter trigger value, prior to complete formation of the bale;
wherein if the measurement corresponding to the bale diameter is less than the diameter trigger value, the method comprises, in the controller, repeating collection of the measurement corresponding to the bale diameter;
wherein if the measurement corresponding to the bale diameter is greater than the diameter trigger value, the method comprises, in the controller, collecting a real-time measurement corresponding to a bale weight from at least one weight sensor, and comparing the measurement corresponding to the bale weight to the bale weight value; and
wherein if the measurement corresponding to the bale weight is different from the bale weight value, commanding the at least one density adjuster to adjust the density during the formation of a bale in the baling mechanism.

18. The computer program product of claim 17, wherein step (a) further comprises receiving a bale moisture value from at least a first operator interface; wherein the computer program product comprises instructions to collect a real-time measurement corresponding to bale moisture from at least one moisture sensors; and wherein the computer program product comprises instructions to compare the measurement corresponding to bale moisture to the bale moisture value; and, if the measurement corresponding to the bale moisture is different from the bale moisture value, commanding at least one density adjuster to adjust the density during the formation of a bale.

19. The computer program product of claim 17, wherein the system further comprises at least a first operator interface in electronic communication with the controller, the density adjuster, and the baling mechanism, such that the controller is configured to receive and send digital information to and from the density adjuster and the at least first operator interface; and wherein the method comprises:
(a) in a controller, receiving an upper bale weight value, a lower bale weight value, a bale diameter value, a bale moisture value, a density step value, and a high-moisture density value from at least a first operator interface;
(b) in a controller, collecting a real-time measurement corresponding to bale moisture from at least one moisture sensor, and comparing the measurement corresponding to bale moisture to the bale moisture value;
(c) in a controller, collecting the real-time measurement corresponding to the bale weight from at least one weight sensor, and comparing the measurement corresponding to the bale weight to the lower bale weight value and/or the upper bale weight value;
(d) in a controller, collecting a real-time measurement corresponding to bale diameter from at least one diameter sensor; and comparing the measurement corresponding to bale diameter to the bale diameter value;
wherein step (b):
(1) if the measurement corresponding to the bale moisture is less than the bale moisture value, the controller proceeds to step (b) of claim 17;

(2) if the measurement corresponding to the bale moisture value is greater than the bale moisture value, commanding at least one density adjuster to adjust the density to the high-moisture density value during the formation of bale, and the controller proceeds to step (d);

wherein step (c):
(1) if the measurement corresponding to the bale weight is less than the lower bale weight value, commanding at least one density adjuster to adjust the density by a positive density step value during the formation of a bale;
(2) if the measurement corresponding to the bale weight is greater than the upper bale weight value, commanding at least one density adjuster to adjust the density by a negative density step value during the formation of a bale; and wherein step (d):
(1) if the measure corresponding to the bale diameter value does not equal the bale diameter value, the controller repeats step (b) of claim 17;
(2) if the measure corresponding to the bale diameter value equals the bale diameter value, the controller initiates the wrapping and ejection of the bale.

20. A harvester comprising a bale density adjustment system comprising:
a baling mechanism comprising:
a bale chamber; and
at least a first density adjuster configured to adjust of the density of a bale in the bale chamber;
at least a first weight sensor, located in or proximate to the bale chamber, configured to measure a bale weight of a bale in the bale chamber;
at least a first diameter sensor, located in or proximate to the bale chamber, configured to measure a bale diameter of a bale in the bale chamber;
at least a first operator interface configured to receive and/or store a diameter trigger value, a predetermined bale weight value and a predetermined bale diameter value from an operator; and
a controller, in operable communication with and configured to process digital and/or analog information from the at least first weight sensor, the at least first diameter sensor, the at least first density adjuster, and the at least first operator interface;
wherein the controller is configured to collect a measurement corresponding to the bale diameter from the at least one first diameter sensor, and compare the measurement corresponding to the bale diameter to the diameter trigger value, and
(i) if the measurement corresponding to the bale diameter is less than the diameter trigger value, the controller is configured to repeat collection of the measurement corresponding to the bale diameter; and
(ii) if the measurement corresponding to the bale diameter is greater than the diameter trigger value, the controller is configured to collect a measurement corresponding to the bale weight from the at least one first weight sensor, and compare the measurement corresponding to the bale weight to the predetermined bale weight value.

* * * * *